United States Patent [19]
McDaniel

[11] 4,308,172
[45] Dec. 29, 1981

[54] CHEMICAL DEHYDROXYLATION OF SILICA

[75] Inventor: Max P. McDaniel, Bartlesville, Okla.

[73] Assignee: Phillips Petroleum Company, Bartlesville, Okla.

[21] Appl. No.: 151,848

[22] Filed: May 21, 1980

[51] Int. Cl.³ .................... B01J 21/00; B01J 23/26
[52] U.S. Cl. .................... 252/452; 252/458; 423/347
[58] Field of Search ............... 252/452, 458; 423/341, 423/347

[56] References Cited

U.S. PATENT DOCUMENTS

| | | | |
|---|---|---|---|
| 3,007,905 | 11/1961 | Bailey | 252/458 X |
| 3,041,144 | 6/1962 | Schering | 423/347 |
| 3,280,096 | 10/1966 | Mackenzie | 260/94.9 |
| 3,629,150 | 12/1971 | Addy | 252/442 |
| 3,892,678 | 7/1975 | Halasz et al. | 252/426 |
| 3,976,632 | 8/1976 | Delap | 526/113 |
| 3,997,465 | 12/1976 | Grossman et al. | 423/325 X |

OTHER PUBLICATIONS

Modified Silica Gels as Adsorbents and Catalysts, Burwell, Jr., Chemtech, Jun. 1974, pp. 370–377.

*Primary Examiner*—Carl F. Dees

[57] ABSTRACT

Silica having an enhanced level of dehydration beyond what can be produced by heating alone is produced by a three step process comprising (1) chlorination, (2) dechlorination, and (c) oxidation. The resulting dehydroxylated silica is a novel composition of matter and is useful as a reinforcing agent in rubber or plastics and as a support for a chromatographic column in addition to being suitable for a catalyst support. Where the dechlorinating agent is hydrogen, a hydrophobic silica composition containing $\equiv$Si—H structures and essentially no —OH groups is produced which is suitable for use as a reducing agent, a coupling agent as well as a precursor for the oxidized dehydroxylated silica described above.

23 Claims, No Drawings

CHEMICAL DEHYDROXYLATION OF SILICA

BACKGROUND OF THE INVENTION

This invention relates to the preparation of treated silica.

It is known that water in a silica composition is harmful in certain applications. For instance, it is conventional to heat silica supports for such catalytic agents as chromium in order to remove water (dehydration). As higher dehydration temperatures are used surface hydroxyl, i.e., —OH groups are also removed, thus releasing additional water and forming $\equiv$SiOSi$\equiv$(siloxane) structures. This dehydroxylation is generally thought of as a continuation of, or a specific form of, dehydration since water is given off due to the formation of silicon-oxygen-silicon bonds.

Chromium oxide catalysts on silica-containing supports can be used to prepare olefin polymers in a hydrocarbon solution to give a product having excellent characteristics from many standpoints. Supported chromium oxide catalysts can also be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in a solution process, control of the molecular weight can be effected by changing the temperature, with lower molecular weight (higher melt flow) being obtained at the higher temperatures. However, in the slurry process, this technique is inherently limited since any effort to increase the melt flow to any appreciable extent by increasing temperature causes the polymer to go into solution and thus destroys this slurry or particle-form process.

One way to achieve a higher melt flow polymer is to heat the support to a higher temperature since the melt index increases with increasing activation temperature due to the removal of progressively more —OH groups up to the point where sintering begins. Since further melt index improvement would be possible if more —OH groups could be removed, it would be desirable to utilize some method other than simple heating to remove —OH groups.

SUMMARY OF THE INVENTION

It is an object of this invention to provide a silica having a lower —OH content than can be obtained by simple heating; it is a further object of this invention to provide a catalyst capable of giving high melt flow polymer; it is a further object of this invention to provide a catalyst suitable for use in slurry polymerization systems; it is a further object of this invention to produce an improved support for chromium-containing catalysts; it is a further object of this invention to provide an improved method of producing a chromium-containing catalyst; and it is a further object of this invention to provide a catalyst capable of giving polymer suitable for injection molding and other applications requiring high melt flow and narrow molecular weight distribution.

In accordance with the main embodiment of this invention, a silica-containing composition is subjected to a three step dehydroxylation treatment comprising (1) chlorination, (2) dechlorination, and (3) oxidation. In accordance with a more specific embodiment of this invention, a silica composition having $\equiv$SiH (silane) structures, being essentially free of —OH groups and also essentially free of any extraneous material is provided by using hydrogen as the dechlorination agent and omitting the oxidizing step.

DESCRIPTION OF THE PREFERRED EMBODIMENTS

The silica-containing material to be treated can be selected from catalytic grade silica, silica-alumina, silica-boria, silica-titania, silica-zirconia, and the like, or mixtures thereof, in which the silica constitutes from 80 to 100 weight percent of the silica-containing material. Suitable particulate silica-containing materials are broadly disclosed in Hogan et al, U.S. Pat. No. 2,825,721 (Mar. 4, 1958), the disclosure of which is hereby incorporated by reference. When the purpose is to produce a catalyst support, the silica-containing material is preferably a cogel, that is, a silica produced by coprecipitating titanium and silica as disclosed in Dietz, U.S. Pat. No. 3,887,494 (June 3, 1975), the disclosure of which is hereby incorporated by reference. For instance, this cogel formation can be carried out by adding a titanium compound to a mineral acid, introducing an alkali metal silicate into the acid containing said titanium compound to form a hydrogel, aging the hydrogel for a time of greater than 1 hour, washing the thus aged hydrogel to produce a substantially alkali metal free hydrogel, forming a mixture comprising the thus washed hydrogel and a normally liquid oxygen-containing water soluble organic compound, such as ethyl acetate, and separating said organic compound and water from said mixture to form a xerogel. The titanium is present in these cogels in an amount within the range of 0.1 to 10, preferably 0.5 to 5 weight percent titanium based on the weight of the dried cogel (xerogel).

The difficulty of removing all —OH groups by simple heating is shown by the following tabulation showing the effects of simple heating of catalytic grade silica in air:

| Drying Temp | Surface Area | $-OH/m\mu^2$ |
| --- | --- | --- |
| 200° C. | 285 | 3.9 |
| 220° C. | — | 3.3 |
| 300° C. | 298 | 2.8 |
| 400° C. | 303 | 2.4 |
| 500° C. | — | 1.8 |
| 600° C. | 296 | 1.4 |
| 700° C. | 288 | 1.1 |
| 800° C. | 273 | 0.9 |
| 900° C. | 245 | 0.7 |
| 1000° C. | 60 | 0.6 |

As can be seen, the surface area is adversely affected at sintering temperature and the —OH groups are still not completely removed.

In accordance with this invention, the first step of the treating process, the chlorination can be carried out in a manner known in the art. For instance, the silica can be treated with thionyl chloride ($SOCl_2$) at relatively low, but still elevated, temperatures. Other suitable chlorinating agents are carbon tetrachloride ($CCl_4$), carbonyl chloride ($COCl_2$) and chlorine gas ($Cl_2$) which are generally used at substantially elevated temperatures. Also suitable but less preferred is tetrachloroethylene ($C_2Cl_4$). Also sulfuryl chloride ($SO_2Cl_2$) which decomposes on heating to $Cl_2$ can be used.

The chlorinations can be carried out at any elevated temperature up to the sintering temperature of the silica although, of course, the reaction is accelerated by utilizing a relatively high temperature, for instance at least 350° C. The chlorinations can be carried out in an inert atmosphere such as nitrogen, in a reducing atmosphere such as carbon monoxide, or in an oxygen-containing atmosphere such as air. The chlorination times can be from as little as one minute, particularly at higher temperatures, to as much as 10 days, particularly at the lower temperatures, although generally times of 0.1 to 10 hours are utilized. With carbon tetrachloride, times of 1 to 4 hours and temperatures of 300° to 700° C., preferably 350° to 600° C. are particularly preferred. If it is desired to utilize lower temperatures, thionyl chloride is the most effective reagent for use below 400° C. Preferred temperatures for thionyl chloride are 200° to 400° C. Thus temperatures from just above room temperature to about 900° C., or whatever the exact sintering temperature is can be used. One convenient method of achieving the chlorination is to utilize a fluidized bed of the silica, the fluidization being achieved by flowing the chlorination gas through the sample.

While only a stoichiometric amount of the chlorinating agent would be required, the amount of —OH groups is so small in absolute terms (generally about 3.9 to 4.6 OH groups per square millimicron), that a very large excess is used just as a matter of convenience.

The second step, dechlorination, is preferably carried out by reacting the chlorinated product of the first step with hydrogen or an alcohol or a mixture of hydrogen and an alcohol. The alcohol is preferably a 1 to 12 carbon atom aliphatic alcohol, more preferably a 1 to 5 carbon atom alcohol, still more preferably methanol or ethanol, most preferably methanol. Any other reagent that will remove essentially all of the chlorine and replace it with a material which can be burned off below the sintering temperature of the silica can be used.

The hydrogen or alcohol or other dechlorination agent can be used pure or can be diluted with an inert diluent such as nitrogen. The ambient should be dry, of course. Particularly with hydrogen, it is preferred to use at least 50, preferably 50 to 75 volume percent diluent for safety reasons. The temperature for the hydrogen treatment can be from 250° to 900° C., preferably from 800° to 900° C. Lower temperatures can be used with the alcohol, generally temperatures from room temperature to 400° C. being operable, preferably temperatures of 200° to 400° C. are used. Thus broadly temperatures of 200° to about 900° C., or whatever the sintering temperature is, can be used.

The time for treatment with either the hydrogen or alcohol or other dechlorinating agent can range from 1 minute to 24 hours, preferably ½ hour to 2 hours. At the lower temperatures, longer times can be utilized and at the higher temperatures, shorter times can be utilized. The dechlorination treatment can be carried out in any convenient manner such as in a fluidized bed.

The silica resulting from the dechlorination treatment can have an —OH content too low to be detected by the means described hereinafter. It is believed this is accurate to two significant figures. Thus the OH content is less than 0.00 or even assuming some error in the test certainly less than 0.0 —OH groups per square millimicron.

Thus with hydrogen as the dechlorination agent, a hydrophobic ≡Si—H containing material is produced which is a novel composition of matter and is suitable for use as a reducing agent or coupling agent in addition to being precursor for the novel oxidized dehydroxylated silica described hereinbelow. This composition then consists essentially of the dehydroxylated silica containing ≡Si—H groups. That is, while the base silica may have other oxides such as alumina, titania, etc., there are no extraneous contaminants such as lithium chloride, which is present when ≡Si—H structures are obtained by treating chlorinated silica with lithium hydride.

In the third step of this invention, the combustible material incorporated onto the silica such as the hydrogen and/or alkoxy groups is burned off in a dry oxygen-containing ambient such as air. When it is desired to utilize the resulting composition as a base for chromium catalysts, it is essential that the temperature for the oxidation be relatively high so as to burn off essentially all of the combustible matter, temperatures from about 600° C. up to about 900° C., or whatever the sintering temperature is, being suitable.

While not wishing to be bound by theory, it is believed the reactions are as follows when the chlorination agent is a $Cl_4$ and either hydrogen as an alcohol is used as its dechlorination agent:

  (1)

  (2)

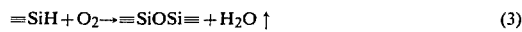  (3)

  (1)

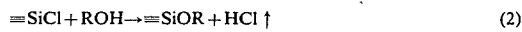  (2)

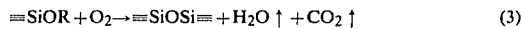  (3)

R is an alkyl radical of 1–12 carbon atoms.

The final silica of equation 3 can have essentially zero percent hydroxyl content, .e., less than 0.0, preferably less than 0.00 OH per square millimicron as measured by reaction with $CH_3MgI$ or $CH_3Li$ as described in J. J. Fripiat and J. Uytterhoeven, J. Phys. Chem., 66 800 (1962). Even in runs where a detectible amount of —OH is still present, it is lower than can be obtained by heating alone.

The support after the chlorination, dechlorination and oxidation is then cooled and the chromium added without the introduction of water if it is desired to produce an olefin polymerization catalyst. Suitable chromium compounds are selected from diarene chromium compounds as described in Delap, U.S. Pat. No. 3,976,632 (Dec. 4, 1974), the disclosure of which is hereby incorporated by reference; alkyl or aryl esters of chromic acid and chromium acetylacetonate as described in Hill, U.S. Pat. No. 3,349,067 (Oct. 24, 1967), the disclosure of which is hereby incorporated by reference. Bis-(cyclopentadienyl)chromium(II) compounds as described in Karpinka, U.S. Pat. No. 3,709,853 (Jan. 9, 1973), the disclosure of which is hereby incorporated by reference and silyl chromates as described in Johnson, U.S. Pat. No. 3,704,287 (Nov. 28, 1972), the disclosure of which is hereby incorporated by reference. Generally, a solution or a slurry of the chromium compound in a dry organic liquid inert to the compound and support is used to contact the treated support. Examples of suitable organic liquids include paraffins such as n-heptane, cycloparaffins such as cyclohexane and aromatic hydrocarbons such as benzene. Following the contacting, the composite is dried. Sufficient chromium is used to give 0.001 to 10, preferably 0.1 to 5, more preferably 0.5 to 1 weight percent based on the weight of the silica-containing base.

The composite after the anhydrous incorporation of the chromium compound is then activated in a manner conventional in the art for the particular type of chromium compound used. Preferably, the composite is activated by contact with an oxygen-containing ambient such as air at temperatures ranging from about 15°–870° C., preferably 300°–760° C., more preferably 300°–400° C. As noted, the preferred ambient is air. However, any oxygen-containing ambient having from 2–100% oxygen and from 0–98% of an inert gas such as nitrogen can be used. In some instances, it is desirable to use a controlled smaller amount of oxygen by utilizing a nitrogen-air mixture. It is also possible, though much less preferred, to activate the $\pi$-bonded organo-chromium compounds, particularly the dicyclopentadienyl chromium(II) compounds in an inert atmosphere such as nitrogen for the same times and temperatures used with oxygen. Following the activation, the catalysts are cooled, if necessary, and stored in a dry, inert atmosphere until ready for use. $NO_2$, $N_2O$ and oxygen-containing halogen compounds can also be used as the oxidizing agent. Suitable oxygen-containing halogen compounds are $I_2O_5$ and $Cl_2O$.

The activation times will generally be at least 5 minutes, preferably 10 minutes to 10 hours, more preferably 30 minutes to 3 hours. The concentration of the chromium compound is such that the final activated catalyst contains from 0.001 to 10 preferably 0.1 to 5, more preferably about 1 weight percent chromium based on the weight of the chromium compound and support.

Alternatively, chromium can be anhydrously introduced onto the dechlorinated silica and the silica oxidized and the chromium activated simultaneously, again by heating at a temperature sufficient to burn off organic matter, for instance about 600° C. up to, but, of course just below, the sintering temperature, i.e., about 900° C.

The catalysts of this invention can be used to polymerize at least one mono-1-olefin containing 2 to 8 carbon atoms per molecule. The invention is of particular applicability in producing ethylene homopolymers and copolymers from mixtures of ethylene and one or more comonomers selected from 1-olefins or dienes containing 3 to 8 carbon atoms per molecule. Exemplary comonomers include aliphatic 1-olefins, such as propylene, 1-butene, 1-hexene, and the like and conjugated or non-conjugated diolefins, such as 1,3-butadiene, isoprene, piperylene, 2,3-dimethyl-1,3-butadiene, 1,4-pentadiene, 1,7-hexadiene, and the like and mixtures thereof. Ethylene copolymers preferably constitute about 90, preferably 95 to 99 mole percent polymerized ethylene units. Most preferred monomers are at least one of ethylene, propylene, 1-butene, 1-pentene and 1-hexene.

The polymers can be prepared from the activated catalysts of this invention by solution polymerization, slurry polymerization, and gas phase polymerization techniques, using conventional equipment and contacting processes. However, the catalysts of this invention are particularly suitable in slurry polymerizations for the production of high melt index (MI) polymers, i.e., ethylene homopolymers having MI values of 2 and above at 102° C. polymerization temperature in the absence of molecular weight modifiers, such as hydrogen, and molecular weight distribution value sufficiently narrow to be of commercial interest for applications such as injection molding. Identical catalyst using a base conventionally prepared (under conditions considered optimum in the prior art to give high melt index in commercial operations) yield fractional MI polymers, i.e., a polymer of a MI of less than 1 at a reactor temperature of 102° C. At higher reactor temperatures, higher MI and lower HLMI ratio values are obtained At a reactor temperature of 110° C., polymers of about 40 to 100 MI and higher can be produced in accordance with this invention as compared with polymers of 15 to 20 maximum MI without the treatment of the support set out in this invention. Of course molecular weight modifiers such as hydrogen, cocatalysts such as triethylaluminum or other conventional ingredients can be used in addition if desired.

As can be seen, in order for a fair comparison to be made, it must be done between an invention run and a control run carried out at the same polymerization temperature. Higher melt flow and better molecular weight distribution as evidenced by lower HLMI/MI ratios are obtained at the higher temperatures. However, as is noted hereinabove, there is a practical limit to the maximum temperature which can be utilized in a particle-form process.

EXAMPLE I

A silica-titania cogel was made by adding a titanium compound to a mineral acid, introducing an alkali metal silicate into the acid containing said titanium compound to form a hydrogel, aging the hydrogel for a time of greater than 1 hour, washing the thus aged hydrogel to produce a substantially alkali metal free hydrogel, forming a mixture comprising the thus washed hydrogel and ethyl acetate and separately said organic compound in water from said mixture to form a xerogel as disclosed in Dietz, U.S. Pat. No. 3,887,494 (June 3, 1975).

Run 1 was prepared as follows: A 10 gram sample of this xerogel having a volume of about 50 cc was fluidized in air to a temperature of 400° C., thereafter 2 cc of carbon tetrachloride was added over ½ hour then nitrogen for 5 minutes to flush out any unreacted carbon tetrachloride, $COCl_2$ and HCl.

One cc of methanol was introduced at 400° C. over a time of ½ hour, after which the temperature was raised to 871° C. and air introduced to burn off the methoxy groups.

The silica was then impregnated with ½ weight percent chromium using dicumene chromium and was activated in air at 316° C. The resulting catalyst was used in ethylene homopolymerization at a reaction temperature of 102° C. Control run 1 was carried out in an identical manner except no carbon tetrachloride or alcohol treatment was utilized. That is, the base cogel xerogel was simply heated to 871° C. in air, chromium added and reheated at 316° C. As can be seen comparing Run 1 with Control 1, the control polymer had a much lower melt index. However, the melt index for control 1 of 0.74 is, in fact, a relatively high melt index, control 1 being carried out under conditions considered in the art to be optimum for producing relatively high melt index polymer on a commercial scale. Thus the value of a 3.3 under the conditions used is a genuinely remarkable increase in melt index.

Run 2 was carried out in the same manner as run 1 except a higher activation temperature was utilized. A comparison of Run 2 with Control 2 shows the same advantage at the higher activation temperature for the invention as compared with the control (again the control being carried out under conditions considered in the prior art to be desirable for obtaining high melt flow results, i.e., heating the untreated cogel xerogel to 871° C. in air, adding chromium and reheating to 482° C.).

Runs 3 and 4 were carried out in a manner identical to runs 1 and 2 except the xerogel was heated at 870° C. for the methyl alcohol treatment, and since this was the temperature used for the subsequent air treatment, no temperature change was required between the methyl alcohol treatment and the air oxidation treatment. Thus, it can be seen that similar good results were obtained at the higher methyl alcohol exposure temperature, although at this temperature there may be some decomposition of the methyl alcohol and thus the lower temperatures may be preferred. The results are set out hereinbelow in Table I for ethylene polymerization at 102° C. with no molecular weight modifier.

TABLE I

| Run | MeOH Exposure Temp, °C. | Activation Temp, °C. | MI | HLMI /MI | Productivity, g | Induction Time, min. | Run Time min. |
|---|---|---|---|---|---|---|---|
| 1 | 400 | 316 | 3.3 | 66 | 4820 | 72 | 58 |
| Control 1 | none | 316 | 0.74 | 61 | 4810 | | 53 |
| 2 | 400 | 482 | 2.2 | 68 | 4320 | 4 | 39 |
| Control 2 | none | 482 | 0.88 | 58 | 5030 | | 45 |
| 3 | 870 | 316 | 3.2* | 66 | 4860 | | 50 |
| 4 | 870 | 482 | 2.8 | 62 | 4625 | | 35 |

*A duplicate run gave poor MI results and an analysis revealed that the catalyst contained 0.11 weight percent chlorine indicating some unknown factor had prevented reaction of the methanol, perhaps poor fluidization of the sample during treatment. Analysis of other invention runs indicated essentially complete removal of hydroxyl groups by the chlorination and essentially complete removal of the chlorine by the high temperature hydrogen or alcohol treatment.

EXAMPLE II

Runs essentially identical to Runs 3 and 4 of Example I were carried out except hydrogen was used at 870° C. to remove the chlorine instead of methyl alcohol. The resulting composition was impregnated with chromium and activated as in Runs 3 and 4 of Example I with the following results.

TABLE II

| Run | H₂ Exposure Temp, °C. | Activation Temp, °C. | MI | HLMI /MI | Productivity, g | Induction Time, min. | Run Time min. |
|---|---|---|---|---|---|---|---|
| 5 | 870 | 316 | 4.3 | 57 | 1230 | — | 60 |
| 6 | 870 | 482 | 3.8 | 57 | 4770 | 2 | 55 |
| Control 3 | 870* | 316 | 1.0 | 70 | 4950 | 19 | 68 |

*Hydrogen/CO mixture used

Table II shows that hydrogen is also effective in removing chlorine. Control run 3 shows that the presence of carbon monoxide is undesirable. In addition to the hydrogen/CO mixture, bromine plus air and $SO_2$ were utilized at 870° C. in an effort to remove the chlorine with the results in each case being unsuccessful. Insufficient chlorine was removed by these treatments to form a base for an active olefin polymerization catalyst. For instance, after the bromine plus air treatment, 0.43 weight percent chlorine was left on the silica surface.

While this invention has been described in detail for the purpose of illustration, it is not to be construed as limited thereby but is intended to cover all changes and modifications within the spirit and scope thereof.

I claim:

1. A method comprising (1) subjecting a silica-containing composition at an elevated temperature to a chlorinating agent, (2) subjecting the resulting chlorinated silica-containing composition to a dechlorination treatment at an elevated temperature to remove chlorine, and (3) oxidizing the thus dechlorinated composition at a temperature between 600° C. and the sintering temperature for said silica-containing composition.

2. A method according to claim 1 wherein said chlorinating agent is selected from $CCl_4$, $COCl_2$, $Cl_2$, $C_2Cl_4$, $SO_2Cl_2$ and $SOCl_2$.

3. A method according to claim 1 wherein said chlorinating agent is $CCl_4$.

4. A method according to claim 1 wherein said silica-containing composition is in particulate form and is subjected to said chlorinating agent of step (1) at a temperature within the range of 350° to 800° C.

5. A method according to claim 1 wherein said dechlorination of step (2) is carried out using hydrogen.

6. A method according to claim 1 wherein said dechlorination of step (2) is carried out using an alcohol.

7. A method according to claim 1 wherein said dechlorination of step (2) is carried out at a temperature within the range of 800° to 900° C. using hydrogen and 50 to 75 volume percent of an inert diluent.

8. A method according to claim 1 wherein said dechlorination of step (2) is carried out using methanol and 50 to 75 volume percent of an inert diluent.

9. A method according to claim 1 wherein said oxidation of step (3) is carried out in air.

10. A method according to claim 1 comprising in addition incorporating a chromium compound into said thus oxidized composition under anhydrous conditions and activating the resulting catalyst at a temperature within the range of 15° C. to 870° C. for a time of at least 5 minutes in a dry oxidizing ambient.

11. A method according to claim 10 wherein said silica-containing composition is a coprecipitated silica-titania cogel.

12. A method according to claim 10 wherein said chromium is incorporated in an amount sufficient to give 0.1 to 5 weight percent chromium based on the weight of said silica-containing composition.

13. A method according to claim 10 wherein said silica-containing composition is a silica-titania cogel containing 0.5 to 5 weight percent titanium based on the weight of said cogel.

14. A method according to claim 10 wherein said activation is carried out in air.

15. A method according to claim 10 wherein said chromium compound is incorporated by means of an inert liquid hydrocarbon diluent.

16. A method according to claim 15 wherein said chromium compound is one of a $\pi$-bonded organo-chromium compound, esters of chromic acid, and chromium acetylacetonate.

17. A method according to claim 16 wherein said silica-containing composition is a silica-titania cogel containing about 2 weight percent titanium, said silica-containing composition is subjected in step (1) to $CCl_4$ at a temperature within the range of 350° to 600° C., wherein said chlorinated silica is subjected in step (2) is a 30/70 volume percent hydrogen/nitrogen mixture at a temperature within the range of 800° to 900° C., wherein said oxidation of step (3) is carried out in air, wherein said chromium compound is selected from tertiary butyl chromate, and dicumene chromium in normal hexane, and wherein after said incorporation of said chromium compound said catalyst is activated by heating in air at a temperature within the range of 300° to 500° C.

18. A catalyst produced by the method of claim 17.

19. A catalyst produced by the method of claim 10.

20. A method of producing a hydrophobic silica having Si—H units and essentially no OH comprising (1) subjecting silica to a chlorinating agent selected from $CCl_4$, $COCl_2$, $Cl_2$, $C_2Cl_4$, $SO_2Cl_2$ and $SOCl_2$ at a temperature within the range of 350° to about 900° C. and thereafter subjecting the resulting chlorinated silica to treatment with a hydrogen-containing ambient at a temperature within the range of 250° to 900° C.

21. A method according to claim 20 wherein said hydrogen-containing ambient comprises hydrogen and 50 to 75 volume percent of an inert diluent, said treatment with said hydrogen-containing ambient is carried out at a temperature within the range of 800° to 900° C.

22. A composition produced by the method of claim 20.

23. A composition consisting essentially of a silica-containing material selected from particulate catalytic grade silica, silica alumina, silica-boria, silica-titania, silica-zirconia, or mixtures thereof containing 0.0–OH groups per square millimicron wherein silica constitutes from 80 to 100 weight percent of said silica-containing material.

* * * * *

UNITED STATES PATENT AND TRADEMARK OFFICE
CERTIFICATE OF CORRECTION

PATENT NO. : U. S. 4,308,172
DATED : December 29, 1981
INVENTOR(S) : Max P. McDaniel It is certified that error appears in the above—identified patent and that said Letters Patent is hereby corrected as shown below:

Column 9, line 23, after (2), "is" should be --- to ---.

Column 10, line 25, "0.0-OH" should be --- 0.0 -OH ---.

Signed and Sealed this

Twenty-first Day of June 1983

[SEAL]

*Attest:*

DONALD J. QUIGG

*Attesting Officer*　　*Acting Commissioner of Patents and Trademarks*